A. L. McGREGOR.
BUMPER STRUCTURE.
APPLICATION FILED FEB. 2, 1918.
1,284,119.
Patented Nov. 5, 1918.
2 SHEETS—SHEET 1.
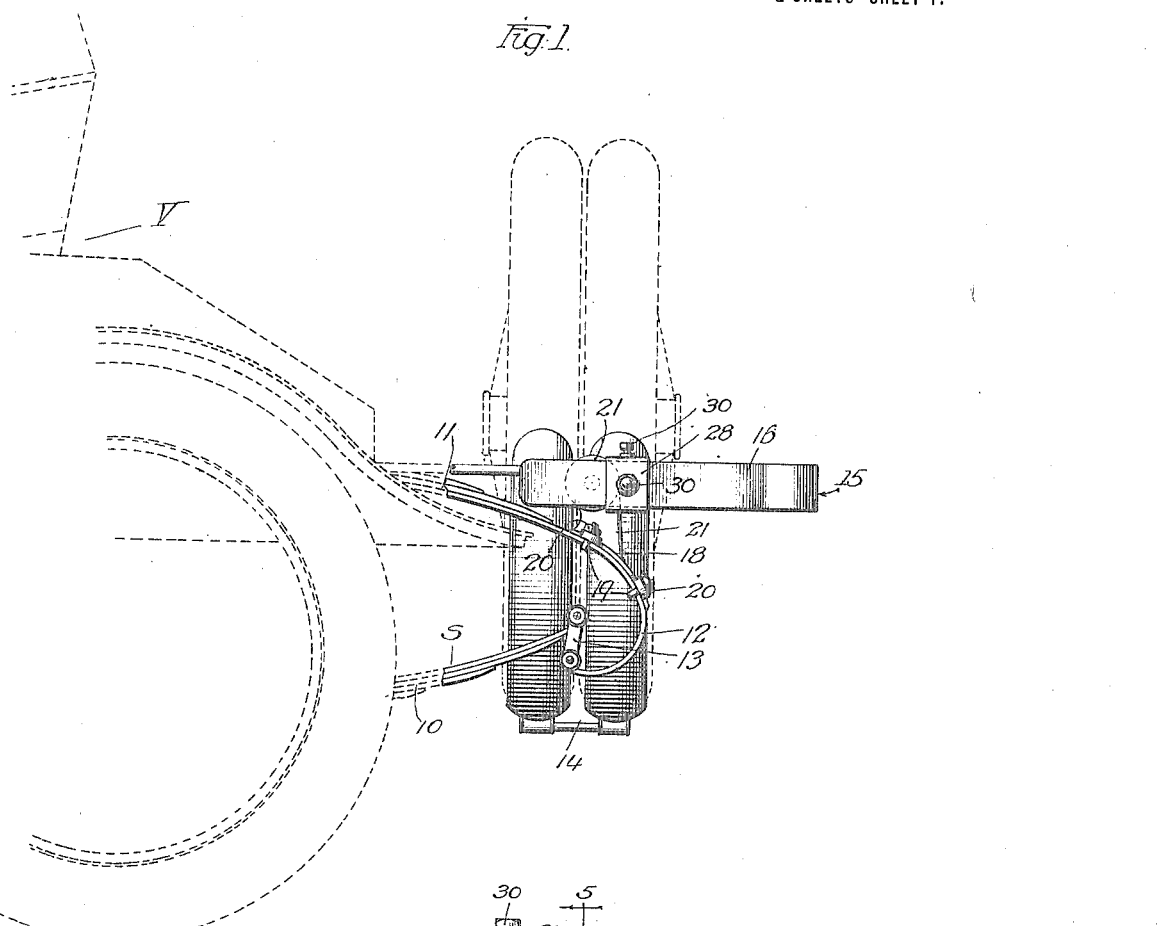
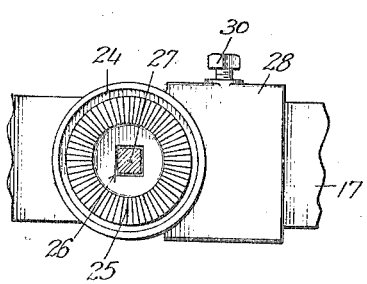
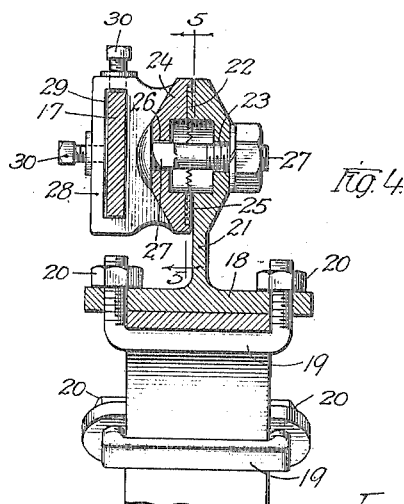
Witnesses:
Robert H. Weir
Arthur W. Carby
Inventor
Allan L. McGregor
James R. Offield
Atty.

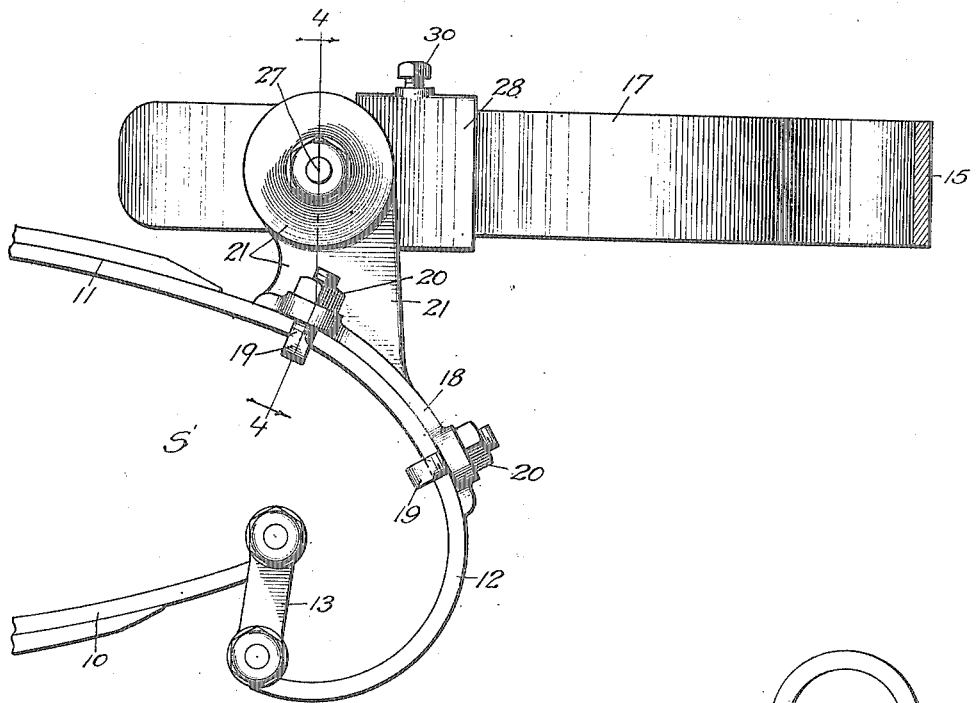
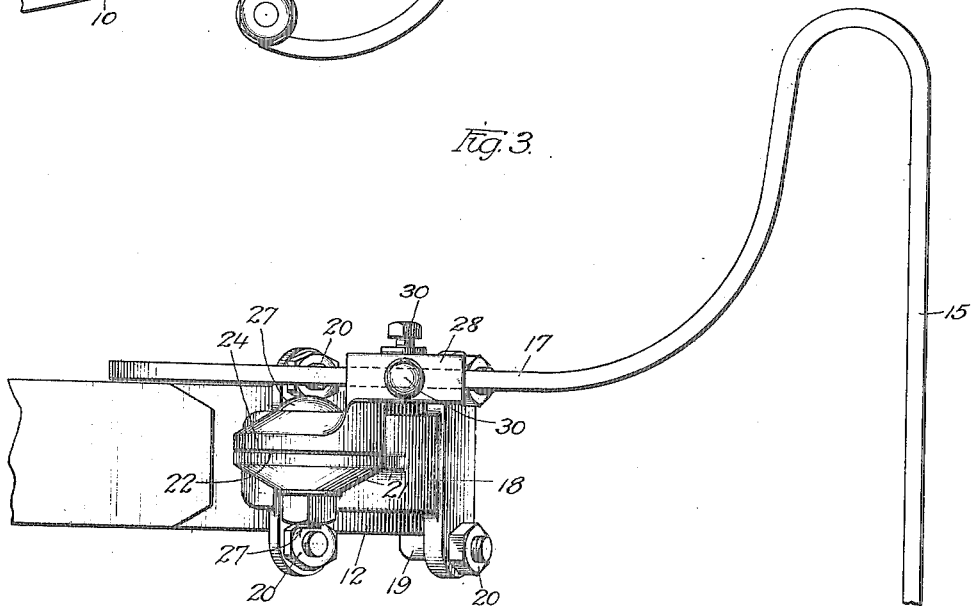

UNITED STATES PATENT OFFICE.

ALLAN L. McGREGOR, OF CHICAGO, ILLINOIS.

BUMPER STRUCTURE.

1,284,119.  Specification of Letters Patent.  Patented Nov. 5, 1918.

Application filed February 2, 1918. Serial No. 215,154.

*To all whom it may concern:*

Be it known that I, ALLAN L. McGREGOR, a citizen of the United States, and a resident of Chicago, in the county of Cook and State of Illinois, have invented certain new and useful Improvements in Bumper Structures, of which the following is a specification.

My invention relates to bumper structures particularly adaptable for attachment to the rear ends of vehicles to protect the vehicles and also the spare tire supporting frame and tires thereon.

The object of the invention is to provide improved means for attaching the bumper structure to the rear springs of the vehicle, and improved construction for permitting adjustment of the bumper bar toward or away from the vehicle, and in other directions, depending upon the number of spare tires carried at the rear of the vehicle.

On the accompanying drawing—

Figure 1 is a side elevational view of the rear end of a vehicle with my improved bumper structure attached, Fig. 2 is an enlarged side elevational view of the end of one of the vehicle rear springs with the bumper structure applied thereto, Fig. 3 is a plan view of the parts shown in Fig. 2, Fig. 4 is a sectional view on plane 4—4, Fig. 2, and Fig. 5 is a sectional view on plane 5—5, Fig. 4.

The vehicle V shown has the rear semi-elliptical springs S and S', each spring comprising a lower member 10 and the upper member 11 whose inner leaf has the downwardly curved end 12 connected with the outer end of the lower spring member 10 by a shackle 13, this being the well known spring construction. 14 represents the spare tire supporting frame secured to the end of the vehicle. It is this vehicle arrangement with which my improved bumper structure is particularly adaptable.

The bumper structure comprises a bumper bar 15 having the rearwardly extending ends 16 and 17, improved fittings being provided to adjustably secure these ends to the vehicle springs. As shown, each fitting comprises a base plate 18, curved to seat against and fit the upper or outer part of the spring ends 12, U-bolts or straps 19 receiving the spring ends and extending through suitable openings in the base to be received by nuts 20. Extending upwardly from the base plate is the bracket or post 21 whose end is circular and provided with a circle of ratchet teeth 22 surrounding the bolt opening 23. A companion fitting comprises the circular head 24 having the circle of ratchet teeth 25 surrounding the bolt opening 26, this opening being preferably square to receive the square shank of a bolt 27, the teeth 25 coöperating with the teeth 22 to rigidly secure the fittings together in any adjusted position when the bolt is tightened.

Extending from the head 24 is a sleeve bracket 28 having the rectangular opening 29 therethrough, the openings of the two fittings receiving the ends 16 and 17 of the bumper bar, these ends being shiftable in said openings to permit the bar 15 to be moved toward or away from the vehicle end depending upon the number of spare tires carried in the supporting frame 14, the drawing showing two such tires. Set screws 30 are provided for securing the bumper ends in the fittings after adjustment. The ratchet connection between the fittings permits relative turning of the fittings and vertical adjustment of the bar 15 with reference to the vehicle end and the tire support. The entire bumper structure can also be adjusted bodily by shifting the supporting bases 18 of the fittings to different positions on the spring ends 12. The bumper bar structure is of itself resilient, and the spring leaves to which the structure is attached will also spring and yield when the bumper is struck, and bumps and shocks are thus in greater part absorbed and the vehicle protected.

The fittings described are of simple construction and are adapted to receive bumper bars different in design and construction from that shown on the drawing. The fittings can be readily attached to the rear springs of a vehicle without special skill or tools and when applied form a rigid adjustable support for bumper bars.

I do not, of course, desire to be limited to the precise construction and arrangement shown and described as modifications are no doubt possible which would still come within the scope of the invention.

I claim as follows:

1. In a bumper structure, the combination of a bumper bar having supporting ends extending at right angles therefrom, fitting members comprising each a supporting base and means for securing it to a support, a bracket extending from the base, a head secured to the bracket to be rotationally adjustable thereon, and a sleeve extension on the head, said sleeve extensions receiving the supporting ends of the bumper bar.

2. A bumper bar structure comprising a bumper bar with supporting ends extending therefrom, supporting fittings for said ends, each fitting comprising a base adapted to be secured to a support, a bracket extending upwardly from the base and having a bolt opening, a circle of ratchet teeth surrounding said bolt opening, a head having a bolt opening and ratchet teeth for coöperating with said bracket ratchet teeth, a bolt extending through the bolt opening to lock the head to the bracket, a sleeve extending from the head, the sleeves of the fittings adjustably receiving the ends of the bumper bar, and set screws on said sleeves for securing such ends in adjusted position therein.

3. Mechanism for securing a bumper bar structure to a vehicle consisting of one fitting member comprising a base and means for securing it to a support, a bracket extending upwardly from said base and having a bolt opening, a circle of ratchet teeth on the face of said bracket surrounding said bolt opening, and a companion fitting comprising a member having a bolt opening and a circle of teeth surrounding such opening, a bolt extending through said bolt holes to secure the fitting members together with the ratchet teeth in engagement, a sleeve extending from said head, said sleeve being adapted to receive the surrounding end of a bumper bar, and a set screw for the sleeve for securing a received bar therein.

4. The combination with a vehicle having semi-elliptical side springs at the rear end, of bumper supporting fittings secured to said springs, each fitting comprising a base engaging with the respective spring, strap bolts secured to the base and encircling the spring, a bracket extending upwardly from the base, a head rotationally adjustable on said bracket, means for locking said head to the bracket in adjusted position, a sleeve extending from the head, a bumper bar having inwardly extending ends engaging in the sleeves of said fittings to be adjustable therein, and set screws for the sleeves for securing the bumper bar ends in adjusted position.

5. The combination with the semi-elliptical side springs of a vehicle, of a bumper supporting fitting for each spring, each fitting comprising a base adjustably secured to the outer end of the inner leaf of the upper of the respective spring, a bracket extending from the base, a head pivoted to said bracket for rotational adjustment, a sleeve extending from the head, and a set screw for the sleeve, the sleeves of the respective fittings being adapted to receive the supporting ends of a bumper bar, said set screws serving to secure the received ends in adjusted position in said sleeves.

In witness whereof, I hereunto subscribe my name this 30th day of January, A. D. 1918.

ALLAN L. McGREGOR.